July 22, 1969  L. SAPER  3,457,452
DISPLAY OF REPETITIVE ANALOG DATA
Filed April 30, 1965  2 Sheets-Sheet 1

INVENTOR.
Lawrence Saper
BY
ATTORNEY

United States Patent Office 3,457,452
Patented July 22, 1969

3,457,452
DISPLAY OF REPETITIVE ANALOG DATA
Lawrence Saper, New York, N.Y., assignor to Datascope Corp., a corporation of New York
Filed Apr. 30, 1965, Ser. No. 452,304
Int. Cl. H01j 29/74
U.S. Cl. 315—19                                              18 Claims

ABSTRACT OF THE DISCLOSURE

There is disclosed a method of displaying a periodically recurring electrocardiographic (EKG) signal wherein each signal includes $p$, $q$, $r$, $s$ and $t$ waves which occur sequentially in that order. The EKG signals are applied to the Y-deflection circuits of a cathode-ray oscilloscope (CRO). Free-running time base signals are generated and applied to the X-deflection circuits of the CRO. The $r$ wave portions of the EKG signals are detected, delayed for a given period of time, and used to synchronize the timebase signals.

---

One of the most convenient ways of displaying analog data signals is with a cathode-ray oscilloscope wherein a visual two-dimensional presentation of a repetitive time varying voltage is shown on the face of a cathode-ray tube. Typically, the X-axis of the cathode-ray tube represents the time axis and the Y-axis represents the amplitude of the data which is displayed. The display is generally produced by simultaneously deflecting the beam of the cathode-ray tube along the X-axis with a time varying voltage and along the Y-axis by a suitably amplified voltage proportional to the data. The time varying voltage applied to the X-axis is called the timebase sweep voltage. This voltage is commonly a linear time function though it may be any desired time function. In oscilloscopes which are unsynchronized the sweep is repetitive in some selectable, but fixed manner. Synchronized oscilloscopes generally control the onset of the sweep which then continues at a predetermined speed and terminates in a predetermined time.

Although cathode-ray oscilloscopes operate over broad frequency ranges, problems often arise when the repetition rate of the signals representing the data is of a low order. When the data to be displayed has a low repetition rate, it is generally necessary to use a correspondingly low sweep speed in order to show the data in a meaningful way. At low sweep speeds, the human eye is unable to integrate the illuminated path of the beam as it travels across the face of the cathode-ray tube. Thus, oscilloscopes designed for the purpose of displaying low frequency data employ a cathode-ray tube with a long persistence phosphor which causes the beam image to persist for some time after the beam strikes the cathode-ray tube screen. The persistence time may be of the order of one second. This enables the viewer to see the wake of the cathode-ray tube beam tracing the waveform of the data as it moves across the screen.

The long persistence screen has a disadvantage, however, in that the ghosts of a previous trace or traces are seen along with the wake of each new trace. This is particularly the case when the repetition rate of the data is low but the data contains many higher frequency components. To see these components clearly, it is necessary to use a sweep speed which will show a single cycle of data. The confusion caused by ghosts is increased at such a sweep speed.

A typical form of low repetition rate analog data is the electrocardiographic signals generated by a beating heart. A typical cycle for the data, as will hereinafter become apparent, includes a series of pulses denominated $p$, $q$, $r$, $s$ and $t$. The initial $p$ and final $t$ pulses of the series have considerably smaller amplitude than an intermediate $r$ pulse in the series. Physiologically, the series occurs in the above order.

If such analog data were displayed on the long persistence cathode-ray tube of an unsynchronized oscilloscope, recent traces as well as "ghosts" of previous traces would be simultaneously visible because the data shifts its position on the cathode-ray tube screen from one trace to the next. This imposes on the viewer a burden of tracking position in order to see the data. Furthermore, the data in each trace or sweep is not displayed in the correct physiological sequence. In addition, the presence of "ghosts" is confusing and makes clinical observation difficult.

One way of reducing the effect of ghosts in unsynchronized oscilloscopes is to use a cathode-ray tube with a large screen. For a given sweep speed, a larger screen allows an increased sweep length and correspondingly, a greater elapsed time per sweep. More time is thereby allowed for the ghost of one sweep to decay before a new sweep is initiated.

The "ghosts" can be removed by synchronizing the timebase sweep voltage to the input data. The synchronization is accomplished by sensing a prominent feature of the data, using this as a trigger to start the sweep. In the case of electrocardiographic signals, the larger $r$ wave or pulse would be sensed because sensing the small $p$ wave or pulse would be difficult and impractical in the presence of the larger $r$ wave. The sweep continues across the screen to an arbitrary point and then resets awaiting the arrival of a new starting pulse.

Although synchronization remedies the problem of "ghosts," it in turn creates new problems. For example, a certain amount of the input data is omitted because of the finite time required for the trigger to start the sweep. In addition, the data is not displayed in the correct physiological sequence because of the practical limitation which makes it necessary to sense for the $r$ wave or pulse.

It is, accordingly, a general object of one aspect of the invention to provide an improved method of displaying electrocardiographic phenomena.

It is another object of this aspect of the invention to provide an improved method of displaying on the cathode-ray tube of an oscilloscope the events of an electrocardiographic cycle in correct physiological order.

It is a further object of this aspect of the invention to provide a method of presenting on the screen of a cathode-ray tube a ghost-free display of all the data in repetitive, electrocardiographic cycles.

It is another object of this invention to provide a method of presenting on the screen of a cathode-ray tube the data in repetitive electrocardiographic cycles which makes possible a reduction in size of the cathode-ray tube.

It is another object of this aspect of the invention to provide a method of displaying periodic electrocardiographic signals which indicates the repetition rate of those signals.

Briefly, this aspect of the invention contemplates displaying a periodically recurring electrocardiographic signal wherein each signal includes $p$, $q$, $r$, $s$ and $t$ waves which occur sequentially in that order. The electrocardiographic signals are applied to the Y-deflecting circuits of a cathode-ray oscilloscope. Free-running timebase signals are generated and applied to the X-deflecting circuits of the oscilloscope. The $r$ wave portion of the electrocardiographic signals are detected, delayed for a given period of time, and used to synchronize the timebase signals.

It is an object of another aspect of the invention to provide an improved timebase sweep generator for a cathode-ray oscilloscope.

It is another object of this aspect of the invention to provide an improved timebase sweep generator which permits a cathode-ray oscilloscope to display, in a ghost-free manner, all the data in a signal of constant repetition rate.

It is a further object of this aspect of the invention to provide an improved timebase generator which permits a cathode-ray oscilloscope to display a signal having portions of different amplitude without the maximum amplitude portion of the signal being the first portion of the signal viewed.

Briefly, this aspect of the invention contemplates a timebase sweep signal generator whose output is fed to the X-deflection means of a cathode-ray oscilloscope which receives a periodically recurring signal at its Y-deflection means. The timebase sweep signal generator comprises an amplitude discriminator-time delay means which receives the periodically recurring signal and transmits a synchronizing signal a given period of time after the received signal exceeds a given amplitude. The synchronizing signal is fed to a free-running timebase signal generator means for transmitting timebase sweep signals to the X-deflection means in order to terminate the sweep in synchronism with the synchronizing signals. The timebase signal generator means initiates a new sweep immediately thereafter.

Other objects, the features and advantages of the invention will be apparent from the following detailed description when read with the accompanying drawing, in which.

Figure 1:
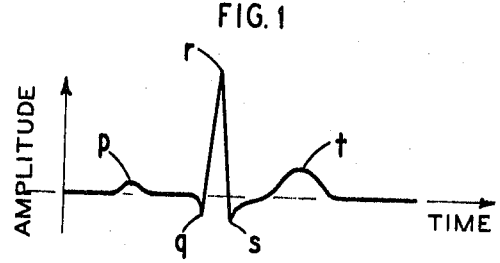
FIGURE 1 shows the desired display of one cycle of a typical repetitive electrocardiographic signal.

Referring now to FIGURE 1, there is shown a single cycle of an electrocardiographic waveform wherein the ordinate represents amplitude and the abscissa represents time. Physiologically, the waveform starts before the positive-going $p$ wave. After the $p$ wave, there occurs the negative-going $q$ wave, followed by the very strong $r$ wave. Following the $r$ wave is the low amplitude $s$ wave which is followed by the medium-strong positive-going $t$ wave. This waveform represents an operating cycle of a beating heart and is of great clinical value when displayed in this order.

Figure 2:
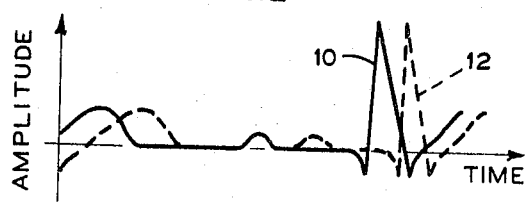
FIGURE 2 shows the display of the typical electrocardiographic signal by an unsynchronized cathode-ray oscilloscope.

When the sweep frequency of an unsynchronized cathode-ray oscilloscope is close to the beat frequency of a heart being monitored the long persistence of the phosphor of the cathode-ray tube causes the display shown in FIGURE 2. A high persistence is required because of the relatively low beat frequency. Solid waveform 10 represents the last monitored beat, while dotted waveform 12 represents the preceding beat. Of course, the display is actually two solid waveforms with waveform 12 slightly less intense than waveform 10. The ghosts of several beats preceding the one indicated by waveform 12 may also be visible, each with less intensity according to their age. These however, have been omitted from FIGURE 2 for the sake of clarity. It should be apparent that the "ghosts" waveforms of 12 and earlier beats are at least an annoyance and more likely create confusion.

Figure 3:
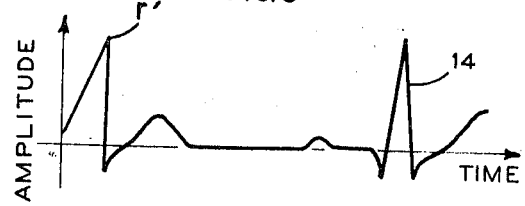
FIGURE 3 shows the display of the electrocardiographic signal by a conventionally synchronized cathode-ray oscilloscope.

The waveform 14 of FIGURE 3 is that displayed by a conventional synchronized cathode-ray oscilloscope (synchroscope). Such oscilloscopes lock the display in on the most prominent portion of the input signal. Hence the display is shown starting somewhere along the leading edge of the $r$ wave. Clearly, in monitoring electrocardiographic phenomena, such a display is undesirable, since the display should logically start during the resting time between the $t$ and $p$ waves. Further, this display is undesirable because of the portion of data omitted from the peak of the $t$ wave until the onset of the sweep somewhere along the $r$ wave.

In order to obtain the desired electrocardiographic display, the following method should be used. The oscilloscope should generate free-running periodically-receiving timebase signals having a free-running period of recurrence greater than the period of recurrence of the electrocardiographic signals. The electrocardiographic signals are fed to the Y-deflection circuits and the timebase signals fed to the X-deflection circuits of the oscilloscope. The $r$ wave portion of the electrocardiographic signals is detected, and delayed for a period of time greater than the time difference between the $r$ wave portion and the $t$ wave portion of each electrocardiographic signal and less than the time difference between the $r$ wave portion of one electrocardiographic signal and the $p$ wave portion of the succeeding electrocardiographic signal. The so detected and delayed $r$ wave portion is used to terminate prematurely the then occurring timebase signal and initiating a new timebase signal.

Figure 4:
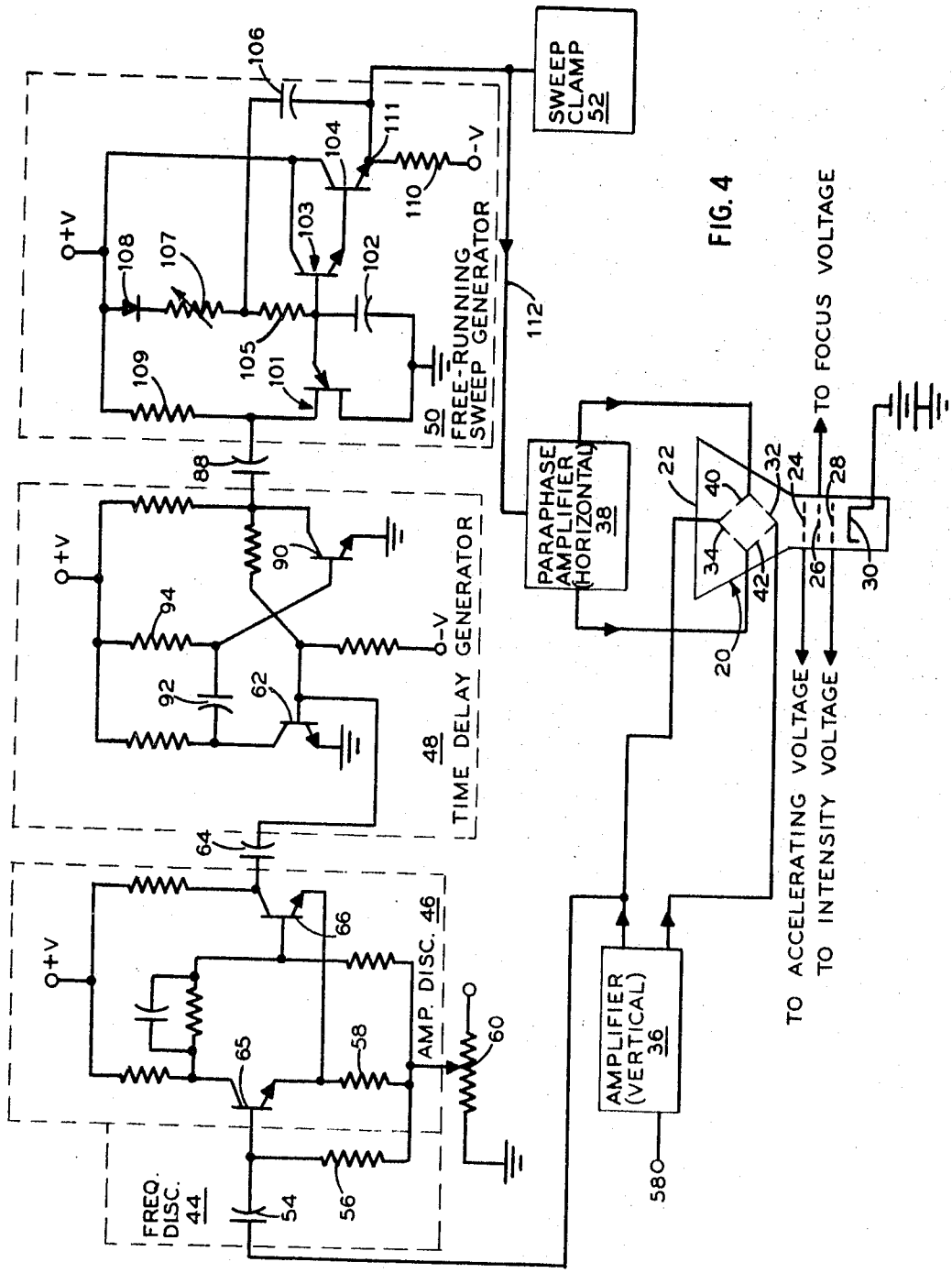
FIGURE 4 is a schematic diagram of a cathode-ray oscilloscope in accordance with the invention.

In FIGURE 4, there is shown a cathode-ray oscilloscope including a timebase sweep generator which can perform the above described method.

The oscilloscope includes a conventional cathode-ray tube 20 which may be of the electrostatic type having a face or screen 22 internally coated with a high persistent phosphor such as the P7 type. The tube has the usual accelerating electrode 24, focusing electrode 26, intensity electrode 28 and cathode 30. Vertical deflection plates 34 and 32 are connected to the output of amplifier 36 whose input receives the signal to be displayed. Plates 32 and 34, and amplifier 36 comprise the Y-deflection circuits of the oscilloscope. Horizontal deflection plates 40 and 42 of the cathode-ray tube 20 are connected to respective outputs of paraphase amplifier 38. Paraphase amplifier 38 and deflection plates 40 and 42 comprise the X-deflection circuits of the oscilloscope.

The X-deflection circuits are fed, via the input of paraphase amplifier 38, a timebase sweep voltage from a timebase sweep generator comprising frequency discriminator 44, amplitude discriminator 46, time delay generator 48 and free running sweep generator 50. A conventional sweep clamp 52 may be connected to the output of the timebase sweep generator.

Frequency discriminator 44, in the form of a differentiator comprising capacitor 54 and resistor 56 is connected to the output of amplifier 36. Amplitude discriminator 46 which may be a cathode-coupled bistable multivibrator (Schmitt trigger circuit) has its input (the base of transistor 65) connected to the output (the junction of capacitor 54 and resistor 56) of frequency discriminator 44. The threshold voltage of discriminator 46 is controlled by the voltage that base resistor 58 is returned to, as schematically indicated by voltage divider 60.

Time delay generator 48 is a monostable relaxation oscillator in the form of a conventional monostable multivibrator. The input of time delay generator 48 (the base of normally cut-off transistor 62) is connected via coupling capacitor 64 to the output of amplitude discriminator 46 (the collector of transistor 66).

Free-running sweep generator 50, a sawtooth waveform generator, comprises: a serially connected diode 108, resistor 107 and resistor 105 which charges capacitor 102; a unijunction transistor 101 which discharges capacitor 102; a double emitter-follower amplifier including transistors 103 and 104; and a feedback capacitor 106 connecting the junction (the output of sweep generator 50) of the emitter of transistor 104 and the emitter resistor 110 to the junction of resistors 105 and 107.

In operation, capacitor 102 charges via diode 108 and resistors 107 and 105. The voltage developed across capacitor 102 (a typical R-C charging waveform) is fed via the double emitter-follower amplifier to junction 111. The voltage from junction 111 is fed back via capacitor 106 to linearize the voltage developed across capacitor 102. Therefore, a very linear voltage with respect to time is developed. This voltage is the timebase voltage and is fed via 112 to paraphase amplifier 38 to provide the timebase voltage. When the charging voltage reaches the critical threshold value of unijunction transistor 101, the transistor "fires" and the emitter of transistor 101 draws current to discharge capacitor 102. Thus capacitor 102, resistors 107 and 105, and transistor 101 operate as a conventional free-running sawtooth waveform generator with linearization provided by feedback capacitor 106 and a low impedance output provided by the double emitter-follower amplifier. During the charging of capacitor 102 the sweep voltage is generated and during the discharge of this capacitor, the retrace voltage is generated. The period of the sweep voltage can be varied by varying resistor 107. The relaxation oscillation will proceed unimpeded in the absence of synchronization. However, the base of unijunction transistor 101 (a synchronizing input) is connected via differentiating capacitor 88 to the collector of transistor 90 (the output of time delay generator 48).

The operation of the oscilloscope will now be described. The time base voltage from the output of free-running sweep generator 50 (the junction 111) is fed via paraphase amplifier 38 to the horizontal deflection plates 40 and 42. A free-running sweep is displayed on the face 22 of cathode-ray tube 20. When the input signal is received at input terminal 58, it is fed via amplifier 36 to the vertical deflection plate 34. Initially, there is no synchronization between the input signal and the timebase signal. However, when a high frequency large amplitude portion of the input signal, such as the r wave portion of an electrocardiographic signal is present at input 58, the amplified signal from amplifier 36 triggers transistor 65 on and transistor 66 off. As the amplitude subsides, the transistors return to their initial state. Accordingly, a positive-going trigger pulse is fed to the base of transistor 62 which turns on, turning off transistor 90. The positive-going voltage at the collector of transistor 90 is differentiated by capacitor 88 but has no effect on transistor 101. Sometime later, determined by the time constant of resistor 94 and capacitor 92, the monostable multivibrator returns to its stable state with transistor 90 conducting and transistor 62 cut off. The negative-going voltage at the collector of transistor 90 is differentiately by capacitor 88 and passes to the base of transistor 101. If transistor 101 is conducting at this time the timebase voltage is in the retrace portion and the desired synchronization fortuitously occurs. However, if transistor 101 is nonconducting at this time, which is more probable, the sweep portion of the timebase voltage is in progress. This pulse is of sufficient amplitude to cause the unijunction transistor 101 to fire at any time after any desired portion of the free running charging cycle has been completed. For example, by a suitable choice of amplitude it is possible to allow synchronization only after at least 50% of the charge cycle is completed. This would insure a sweep length on the face of the cathode-ray tube of at least 50% of full scale minimum. In any event, the sweep terminates and the retrace starts and the timebase voltage is driven into the desired synchronization with the input signal. Henceforth, the timebase will be in synchronism with input signal. In particular, the next occurring r wave portion will normally occur approximately at the same point in the charging cycle if the beat rate is substantially constant.

It should be noted that by making at least resistor 107 variable, the sweep rate can be varied. In fact, by adjusting resistor 107 it is possible to change the sweep time so that two cycles of the input signal are displayed once per timebase sweep. It should be noted that the delay time may be varied by varying the value of resistor 94, for example. This adjustment would allow for different time intervals in the electrocardiographic signal from the r wave to the p wave.

Although the apparatus of FIGURE 4 was generally described with respect to electrocardiographic signals, it should be apparent that it could be used in monitoring nuclear decaying or other phenomena wherein there is generated repetitive sequential analog data.

It should be noted that the invention permits a ghost-free display because each trace is superimposed on the previous trace. The data is displayed in the correct sequence. No data is omitted. Furthermore, since, with respect to the monitoring of the electrocardiographic signals, the timebase voltage is triggered and in synchronism with the r wave portions, the length of the trace is indicative of heart beat rate.

As various changes might be made in the embodiment of the invention herein disclosed without departing from the spirit thereof, it is understood that all matter herein shown or described shall be deemed illustrative and not by way of limitation except as set forth in the appended claims.

What is claimed is:

1. A method for displaying periodically-recurring electrocardiographic signals wherein each signal includes sequentially occurring p, q, r, s, and t waves, in that order, comprising the steps of applying the electrocardiographic signals to the Y-deflecting circuits of a cathode-ray oscilloscope, generating free-running periodically-recurring timebase signals, applying the timebase signals to the X-deflecting circuits of said cathode-ray oscilloscope, detecting the r wave portion of each electrocardiographic signal being applied to said Y-deflection circuits, generating in response to such detection a delayed reference signal and synchronizing said timebase signals with the delayed reference signal.

2. A method for displaying periodically-recurring electrocardiographic signals wherein each signal includes sequentially occurring p, q, r, s, and t waves, in that order, comprising the steps of applying the electrocardiographic signals to the Y-deflecting circuits of a cathode-ray oscilloscope, generating free-running periodically-recurring timebase signals having a free-running period of recurrence greater than the period of recurrence of the electrocardiographic signals, applying the timebase signals to the X-deflecting circuits of said cathode-ray oscilloscope, detecting the r wave portion of each electrocardiographic signal being applied to said Y-deflection circuits, generating in response to such detection a delayed reference signal and synchronizing said timebase signals with the delayed reference signal.

3. A method for displaying periodically-recurring electrocardiographic signals wherein each signal includes sequentially occurring p, q, r, s, and t waves, in that order, comprising the steps of applying the electrocardiographic signals to the Y-deflecting circuits of a cathode-ray oscilloscope, generating free-running periodically-recurring timebase signals having a free-running period of recurrence greater than the period of recurrence of the electrocardiographic signals, applying the timebase signals to the X-deflecting circuits of said cathode-ray oscilloscope, detecting the r wave portion of each electrocardiographic signal being applied to said Y-deflection circuits, generating in response to such detection a reference sgnal delayed for a period of time greater than the time difference between the r wave portion and the t wave portion in each electrocardiographic signal and synchronizing said timebase signals with the delayed reference signal.

4. A method for displaying periodically-recurring electrocardiographic signals wherein each signal includes sequentially occurring p, q, r, s, and t waves, in that order, comprising the steps of applying the electrocardiographic signals to the Y-deflecting circuits of a cathode-ray oscilloscope, generating free-running periodically-recurring timebase signals having a free-running period of recurrence greater than the period of recurrence of the electrocardiographic signals, applying the timebase signal to the X-deflecting circuits of said cathode-ray oscilloscope, detecting the *r* wave portion of each electrocardiographic signal being applied to said Y-deflection circuits, generating in response to such detection a reference signal delayed for a period of time greater than the time difference between the *r* wave portion and the *t* wave portion in each electrocardiographic signal, and less than the time difference between the *r* wave portion of one electrocardiographic signal and the *p* wave portion of the succeeding electrocardiographic signal, and synchronizing said timebase signals with the delayed reference signal.

5. A method for displaying periodically-recurring electrocardiographic signals wherein each signal includes sequentially occurring *p, q, r, s,* and *t* waves, in that order, comprising the steps of applying the electrocardiographic signals to the Y-deflecting circuits of a cathode-ray oscilloscope, generating free-running periodically-recurring timebase signals, applying the timebase signals to the X-deflecting circuits of said cathode-ray oscilloscope, detecting the *r* wave portion of each electrocardiographic signal being applied to said Y-deflection circuits, generating in response to such detection a delayed reference signal, and terminating the then occurring timebase signal and initiating a new timebase signal with the delayed reference signal.

6. A method for displaying periodically-recurring electrocardiographic signals wherein each signal includes sequentially occurring *p, q, r, s,* and *t* waves, in that order, comprising the steps of applying the electrocardiographic signals to the Y-deflecting circuits of a cathode-ray oscilloscope, generating free-running periodically-recurring timebase signals having a free-running period of recurrence greater than the period of recurrence of the electrocardiographic signals, applying the timebase signals to the X-deflecting circuits of said cathode-ray oscilloscope, detecting the *r* wave portion of each electrocardiographic signal being applied to said Y-deflection circuits, generating in response to such detection a delayed reference signal, and terminating the then occurring timebase signal and initiating a new timebase signal with the delayed reference signal.

7. A method for displaying periodically-recurring electrocardiographic signals wherein each signal includes sequentially occurring *p, q, r, s,* and *t* waves, in that order, comprising the steps of applying the electrocardiographic signals to the Y-deflecting circuits of a cathode-ray oscilloscope, generating free-running periodically-recurring timebase signals having a free-running period of recurrence greater than the period of recurrence of the electrocardiographic signals, applying the timebase signals to the X-deflecting circuits of said cathode-ray oscilloscope, detecting the *r* wave portion of each electrocardiographic signal being applied to said Y-deflection circuits, generating in response to such detection a reference signal delayed for a period of time greater than the time difference between the *r* wave portion and the *t* wave portion in each electrocardiographic signal, and terminating the then occurring timebase signal and initiating a new timebase signal with the delayed reference signal.

8. A method for displaying periodically-recurring electrocardiographic signals wherein each signal includes sequentially occurring *p, q, r, s,* and *t* waves, in that order, comprising the steps of applying the electrocardiographic signals to the Y-deflecting circuits of a cathode-ray oscilloscope, generating free-running periodically-recurring timebase signals having a free-running period of recurrence greater than the period of recurrence of the electrocardiographic signals, applying the timebase signal to the X-deflecting circuits of said cathode-ray oscilloscope, detecting the *r* wave portion of each electrocardiographic signal being applied to said Y-deflection circuits, generating in response to such detection a reference signal delayed for a period of time greater than the time difference between the *r* wave portion and *t* wave portion in each electrocardiographic signal, and less than the time difference between the *r* wave portion of one electrocardiographic signal and the *p* wave portion of the succeeding electrocardiographic signal, and terminating the then occurring timebase signal and initiating a new timebase signal with the delayed reference signal.

9. In combination with a cathode-ray oscilloscope including Y-deflection means adapted to receive a periodically-recurring signal and X-deflection means for receiving a timebase sweep signal, a timebase sweep signal generator comprising: an amplitude discriminator means adapted to simultaneously receive the same periodically-recurring signal being received by said Y-deflection means for transmitting a triggering signal each time said periodically-recurring signal exceeds a given amplitude; time delay generator means connected to said amplitude discriminator means for generating a synchronizing signal a predetermined period of time after the receipt of a triggering signal; and a free-running timebase signal generator means including an input means connected to said time delay generator means for receiving the synchronizing signals and an output means for transmitting timebase sweep signals to the X-deflection means which are synchronized to terminate in synchronism with the synchronizing signals.

10. In combination with a cathode-ray oscilloscope including Y-deflection means adapted to receive a periodically-recurring signal and X-deflection means for receiving a timebase sweep signal, a timebase sweep signal generator comprising: an amplitude discriminator means adapted to simultaneously receive the same periodically-recurring signal being received by said Y-deflection means for transmitting a triggering signal each time said periodically-recurring signal exceeds a given amplitude; time delay generator means connected to said amplitude discriminator means for generating a synchronizing signal a predetermined period of time after the receipt of a triggering signal; and a free-running sawtooth signal generator means for periodically generating a sawtooth signal including a synchronizing input means connected to said time delay generator means for prematurely terminating the sawtooth signal whenever a synchronizing signal is received, and an output means for transmitting a timebase sweep signal to the X-deflection means.

11. In combination with a cathode-ray oscilloscope including Y-deflection means adapted to receive a periodically-recurring signal and X-deflection means for receiving a timebase sweep signal, a timebase sweep signal generator comprising: a frequency discriminator means adapted to simultaneously receive the same periodically-recurring signals being received by said Y-deflection means for transmitting only signals having frequencies greater than a given frequency; an amplitude discriminator means connected to said frequency discriminator means for transmitting a triggering signal each time the signals received from said frequency discriminator means exceeds a given amplitude; time delay generator means connected to said amplitude discriminator means for generating a synchronizing signal a predetermined period of time after the receipt of a triggering signal; and a free-running timebase signal generator means including an input means connected to said time delay generator means for receiving the synchronizing signals and an output means for transmitting timebase sweep signals to the X-deflection means which are synchronized to terminate in synchronism with the synchronizing signals.

12. In combination with a cathode-ray oscilloscope including Y-deflection means adapted to receive a periodically-reccurring signal and X-deflection means for receiving a timebase sweep signal, a timebase sweep signal generator comprising: a frequency discriminator means adapted to simultaneously receive the same periodically-recurring signals being received by said Y-deflection means for transmitting only signals having frequencies greater than a given frequency; an amplitude discriminator means connected to said frequency discriminator means for transmitting a triggering signal each time the signals received from said frequency discriminator means exceeds a given amplitude; time delay generator means connected to said amplitude discriminator means for generating a synchronizing signal a predetermined period of time after the receipt of a triggering signal; and a free-running sawtooth signal generator means for periodically generating a sawtooth signal including a synchronizing input means connected to said time delay generator means for prematurely terminating the sawtooth signal whenever a synchronizing signal is received, and an output means for transmitting a timebase sweep signal to the X-deflection means.

13. The timebase sweep signal generator of claim 12 wherein said frequency discriminator means is a differentiator means.

14. The timebase sweep signal generator of claim 12 wherein said amplitude discriminator means is a Schmitt trigger circuit.

15. The timebase sweep signal generator of claim 12 wherein said time delay generator means is a monostable relaxation oscillator.

16. The timebase sweep signal generator of claim 14 wherein said time delay generator means is a monostable multivibrator.

17. In combination with a cathode-ray oscilloscope including Y-deflection means adapted to receive a periodically-recurring signal and X-deflection means for receiving a timebase sweep signal, a timebase sweep signal generator comprising: an amplitude discriminator-delay means adapted to simultaneously receive the same periodically-recurring signal being received by said Y-deflection means for transmitting a synchronizing signal a given period of time after the periodically-recurring signal exceeds a given amplitude; and a free-running timebase signal generator means including an input means connected to said amplitude discriminator-delay means for receiving the synchronizing signals and an output means for transmitting timebase sweep signals to the X-deflection means which are synchronized to terminate in synchronism with the synchronizing signals.

18. In combination with a cathode-ray oscilloscope including Y-deflection means adapted to receive a periodically-recurring signal and X-deflection means for receiving a timebase sweep signal, a timebase sweep signal generator comprising: an amplitude discriminator-delay means adapted to simultaneously receive the same periodically-recurring signal being received by said Y-deflection means for transmitting a synchronizing signal a given period of time after the periodically-recurring signal exceeds a given amplitude; and a free-running sawtooth signal generator means for periodically generating a sawtooth signal including a synchronizing input means connected to said amplitude discriminator-delay means for prematurely terminating the sawtooth signal whenever a synchronizing signal is received, and an output means for transmitting a timebase sweep signal to the X-deflection means.

References Cited
UNITED STATES PATENTS

| | | | |
|---|---|---|---|
| 3,215,136 | 11/1965 | Holter et al. | 128—2.06 |
| 3,229,687 | 1/1966 | Holter et al. | 128—2.06 |
| 3,267,933 | 8/1966 | Mills et al. | 128—2.06 |

RICHARD A. FARLEY, Primary Examiner

CHARLES L. WHITHAM, Assistant Examiner

U.S. Cl. X.R.

128—2.06